US006952482B2

(12) United States Patent
Balan et al.

(10) Patent No.: US 6,952,482 B2
(45) Date of Patent: Oct. 4, 2005

(54) METHOD AND APPARATUS FOR NOISE FILTERING

(75) Inventors: Radu Victor Balan, Levittown, PA (US); Justinian Rosca, Princeton, NJ (US)

(73) Assignee: Siemens Corporation Research, Inc., Princeton, NJ (US)

( * ) Notice: Subject to any disclaimer, the term of this patent is extended or adjusted under 35 U.S.C. 154(b) by 721 days.

(21) Appl. No.: 10/007,460

(22) Filed: Dec. 5, 2001

(65) Prior Publication Data

US 2003/0086575 A1 May 8, 2003

Related U.S. Application Data

(60) Provisional application No. 60/326,626, filed on Oct. 2, 2001.

(51) Int. Cl.[7] ........................................ H04B 15/00
(52) U.S. Cl. ........................ 381/94.1; 381/94.2; 381/92
(58) Field of Search .............................. 381/71.1, 94.1, 381/94.2, 94.3, 92, 94.7; 704/226, 233

(56) References Cited

U.S. PATENT DOCUMENTS 6,717,991 B1 * 4/2004 Gustafsson et al. ......... 375/285

OTHER PUBLICATIONS

Ephraim, Yariv and Malah, David; "Speech Enhancement Using a Minimum Mean–Square Error Short–Time Spectral Amplitude Estimator", IEEE Transactions on Acoustics, Speech and Signal Processing, vol. 32 Dec. 1984 pp. 1109–1121.*

* cited by examiner

*Primary Examiner*—Brian T. Pendleton
(74) *Attorney, Agent, or Firm*—Donald B. Paschburg; F. Chau & Associates, LLP

(57) ABSTRACT

Disclosed is an apparatus for and a method of filtering noise from a mixed sound signal to obtained a filtered target signal, comprising the steps of inputting the mixed signal through a pair of microphones into a first channel and a second channel, separately Fourier transforming each said mixed signal into the frequency domain, computing a signal short-time spectral amplitude $|\hat{S}|$ from said transformed signals, computing a signal short-time spectral complex exponential $e^{i\ arg(S)}$ from said transformed signals, where arg(S) is the phase of the target signal in the frequency domain, computing said target signal S in the frequency domain from said spectral amplitude and said complex exponential.

21 Claims, 2 Drawing Sheets

METHOD AND APPARATUS FOR NOISE FILTERING

CROSS REFERENCE TO RELATED APPLICATION

The present application claims priority to U.S. Provisional Patent Application Ser. No. 60/326,626, filed Oct. 2, 2001, which is hereby incorporated by reference.

FIELD OF THE INVENTION

This invention relates to filtering out target signals from background noise.

BACKGROUND OF THE INVENTION

There has always been a need to separate out target signals from background noise, whether the signals in question are sound or electromagnetic radiation. In the field of sound, noisy environments such as in modes of transport and offices present a communications problem, particularly when one is attempting to carry on a phone conversation. One known approach to this problem is a two-microphone system, wherein two microphones are placed at fixed locations within the room or vehicle and are connected to a signal processing device. The speaker is assumed to be static during the entire use of this device. The goal is to enhance the target signal by filtering out noise based on the two-channel recording with two microphones.

The literature contains several approaches to the noise filter problem. Most of the known results use a single microphone solution, such as is disclosed in S. V. Vaseghi, *Advanced Digital Signal Processing and Noise Reduction*, John Wiley & Sons, 2nd Edition, 2000. In particular, the single channel optimal solution (optimal with respect to the estimation variance) was disclosed in Y. Ephraim and D. Malah, *Speech enhancement using a minimum mean-square error short-time spectral amplitude estimator*, IEEE Trans. on Acoustics, Speech, and Signal Processing, 32(6): 1109–1121, 1984. A modified variant of that estimator was disclosed in Y. Ephraim and D. Malah, *Speech enhancement using a minimum mean-square error log-spectral amplitude estimator*, IEEE Trans. on Acoustics, Speech, and Signal Processing, 33(2):443–445, 1985, the disclosures of all three of which are incorporated by reference herein in their entirety.

SUMMARY OF THE INVENTION

Disclosed is a method of filtering noise from a mixed sound signal to obtained a filtered target signal, comprising the steps of inputting the mixed signal through a pair of microphones into a first channel and a second channel, separately Fourier transforming each said mixed signal into the frequency domain, computing a signal short-time spectral amplitude $|\hat{S}|$ from said transformed signals, computing a signal short-time spectral complex exponential $e^{i\ arg(\hat{S})}$ from said transformed signals, where arg(S) is the phase of the target signal in the frequency domain, computing said target signal S in the frequency domain from said spectral amplitude and said complex exponential.

In another aspect of the method said target signal S in the frequency domain is inverse Fourier transformed to produce a filtered target signal s in the time domain.

Another aspect of the method further comprises the step of computing a spectral power matrix and using said spectral power matrix to compute said spectral amplitude and said spectral complex exponential.

In another aspect of the method said spectral power matrix is computed by spectral channel subtraction.

In another aspect of the method said signal short-time spectral amplitude is computed by the estimation equation $$|\hat{S}| = E[|S| \mid X_1, X_2] = \frac{\sqrt{\pi}}{2}\frac{1}{\sqrt{C_1}}\exp\left(-\frac{C_2^2}{8C_1}\right)\left[1 + \frac{C_2^2}{4C_1}I_0\left(\frac{C_2^2}{8C_1}\right) + \frac{C_2^2}{4C_1}I_1\left(\frac{C_2^2}{8C_2}\right)\right]$$

$$\text{where } I_0(z) = \frac{1}{2\pi}\int_0^{2\pi}\exp(z\cos\beta)d\beta,$$

$$I_n(1) = \frac{1}{2\pi}\int_0^{2\pi}\cos(\beta)\exp(z\cos\beta)d\beta,$$

$$C_1 = \frac{1}{\rho_s} + \frac{1}{\det R_n}(R_{22} + R_{11}|K|^2 - KR_{12} - \overline{K}R_{21}),$$

$$C_2 = \frac{2}{\det R_n}|\overline{X}_1 R_{22} + \overline{X}_2 K R_{11} - X_2 R_{12} - X_1 \overline{K} R_{21}|,$$

$X_1$ and $X_2$ are the Fourier transformed first and second signals respectively, $R_{nm}$ are elements of said spectral power matrix, and K is a constant.

In another aspect of the method said signal short-time spectral complex exponential is computed by the estimation equation $$z \equiv e^{i\arg\hat{g}(S)} = \frac{R_{22}X_1 + R_{11}\overline{K}X_2 - R_{21}\overline{K}X_1 - R_{12}X_2}{|R_{22}X_1 + R_{11}\overline{K}X_2 - R_{21}\overline{K}X_1 - R_{12}X_2|}$$

In another aspect of the method said signal short-time spectral complex exponential is computed by the estimation equation $$z \equiv e^{i\arg\hat{g}(S)} = \frac{R_{22}X_1 + R_{11}\overline{K}X_2 - R_{21}\overline{K}X_1 - R_{12}X_2}{|R_{22}X_1 + R_{11}\overline{K}X_2 - R_{21}\overline{K}X_1 - R_{12}X_2|}$$

In another aspect of the method said target signal S in the frequency domain is computed by the equation $$S=zA$$

In another aspect of the method said target signal is computed by multiplying said signal short-time spectral amplitude by said signal short-time spectral complex exponential.

Another aspect of the method further comprises the step of calibrating a function K(ω), said function equal to a ratio of one said Fourier transformed signal to the other, by the estimation equation $$K(\omega) = \frac{\sum_{t=1}^{F} X_2^c(l,\omega)\overline{X_1^c(l\cdot\omega)}}{\sum_{t=1}^{F} |X_1^c(l,\omega)|^2}$$

where $X_1^c(l,\omega)$, $X_2^c(l,\omega)$ represents the discrete windowed Fourier transform at frequency ω, and time-frame index l of the transformed signals $x_1^c$, $x_2^c$ within time frame c.

Disclosed is an apparatus for filtering noise from a mixed sound signal to obtained a filtered target signal, comprising a pair of input channels for receiving mixed signals from a pair of microphones, a pair of Fourier transformers, each receiving a mixed signal from one of said channels and Fourier transforming said mixed signal into a transformed signal in the frequency domain, a filter, said filter receiving said transformed signals and computing a signal short-time spectral amplitude $|\hat{S}|$ and a signal short-time spectral complex exponential $e^{i\ arg(S)}$ from said transformed signals, where arg(S) is the phase of the target signal in the frequency domain, and Wherein said filter computes said target signal S in the frequency domain from said spectral amplitude and said complex exponential.

Another aspect of the apparatus further comprises a spectral power matrix updater, said updater receiving said transformed signals and computing therefrom a spectral power matrix, and outputting said spectral power matrix to said filter.

Another aspect of the apparatus further comprises an inverse Fourier transformer receiving said target signal S in the frequency domain and inverse Fourier transforming said target signal into a filtered target signal s in the time domain.

Disclosed is a program storage device readable by machine, tangibly embodying a program of instructions executable by machine to perform method steps for filtering noise from a mixed sound signal to obtained a filtered target signal, said method steps comprising inputting the mixed signal through a pair of microphones into a first channel and a second channel, separately Fourier transforming each said mixed signal into the frequency domain, computing a signal short-time spectral amplitude $|\hat{S}|$ from said transformed signals, computing a signal short-time spectral complex exponential $e^{i\ arg(S)}$ from said transformed signals, where arg(S) is the phase of the target signal in the frequency domain, computing said target signal S in the frequency domain from said spectral amplitude and said complex exponential.

In another aspect of the invention said target signal S in the frequency domain is inverse Fourier transformed to produce a filtered target signal s in the time domain.

Another aspect of the invention further comprises the step of computing a spectral power matrix and using said spectral power matrix to compute said spectral amplitude and said spectral complex exponential.

In another aspect of the invention said spectral power matrix is computed by spectral channel subtraction.

In another aspect of the invention said signal short-time spectral amplitude is computed by the estimation equation $$|\hat{S}| = E[|S| \mid X_1, X_2] = \frac{\sqrt{\pi}}{2}\frac{1}{\sqrt{C_1}}\exp\left(-\frac{C_2^2}{8C_1}\right)\left[1 + \frac{C_2^2}{4C_1}I_0\left(\frac{C_2^2}{8C_1}\right) + \frac{C_2^2}{4C_1}I_1\left(\frac{C_2^2}{8C_2}\right)\right]$$

$$\text{where } I_0(z) = \frac{1}{2\pi}\int_0^{2\pi}\exp(z\cos\beta)d\beta,$$

$$I_n(1) = \frac{1}{2\pi}\int_0^{2\pi}\cos(\beta)\exp(z\cos\beta)d\beta,$$

$$C_1 = \frac{1}{\rho_s} + \frac{1}{\det R_n}(R_{22} + R_{11}|K|^2 - KR_{12} - \overline{K}R_{21}),$$

$$C_2 = \frac{2}{\det R_n}|\overline{X}_1 R_{22} + \overline{X}_2 K R_{11} - X_2 R_{12} - X_1\overline{K}R_{21}|,$$

$X_1$ and $X_2$ are the Fourier transformed first and second signals respectively, $R_{nm}$ are elements of said spectral power matrix, and K is a constant.

In another aspect of the invention said signal short-time spectral complex exponential is computed by the estimation equation $$z \equiv e^{i\hat{\arg}(S)} = \frac{R_{22}X_1 + R_{11}\overline{K}X_2 - R_{21}\overline{K}X_1 - R_{12}X_2}{|R_{22}X_1 + R_{11}\overline{K}X_2 - R_{21}\overline{K}X_1 - R_{12}X_2|}$$

In another aspect of the invention said signal short-time spectral complex exponential is computed by the estimation equation $$z \equiv e^{i\hat{\arg}(S)} = \frac{R_{22}X_1 + R_{11}\overline{K}X_2 - R_{21}\overline{K}X_1 - R_{12}X_2}{|R_{22}X_1 + R_{11}\overline{K}X_2 - R_{21}\overline{K}X_1 - R_{12}X_2|}$$

In another aspect of the invention said target signal S in the frequency domain is computed by the equation $$S = zA$$

In another aspect of the invention said target signal is computed by multiplying said signal short-time spectral amplitude by said signal short-time spectral complex exponential.

Another aspect of the invention further comprises the step of calibrating a function K(ω), said function equal to a ratio of one said Fourier transformed signal to the other, by the estimation equation $$K(\omega) = \frac{\sum_{t=1}^{F} X_2^c(l, \omega)\overline{X_1^c}(l \cdot \omega)}{\sum_{t=1}^{F} |X_1^c(l, \omega)|^2}$$

where $X_1^c(l,\omega)$, $X_2^c(l,\omega)$ represents the $c^{th}$ discrete windowed Fourier transform at frequency ω, and time-frame index l of the transformed signals $x_1^c$, $x_2^c$.

Another aspect of the invention further comprises the step of updating a function K(ω), said function equal to a ratio of one said Fourier transformed signal to the other, said updating effected by using a linear combination between a previous value for K(ω) at a time t−1 and a current value for K(ω) at a time t according to the equation $$K^t(\omega) = (1-\alpha)K^{t-1}(\omega) + \alpha K(\omega)$$

where α is an adaptation rate.

DETAILED DESCRIPTION OF PREFERRED EMBODIMENTS

This invention generalizes the minimum variance estimators of Y. Ephraim and D. Malah, supra, to a two-channel scheme, by making use of a second microphone signal to further enhance the useful target signal at reduced level of artifacts.

Figure 1:
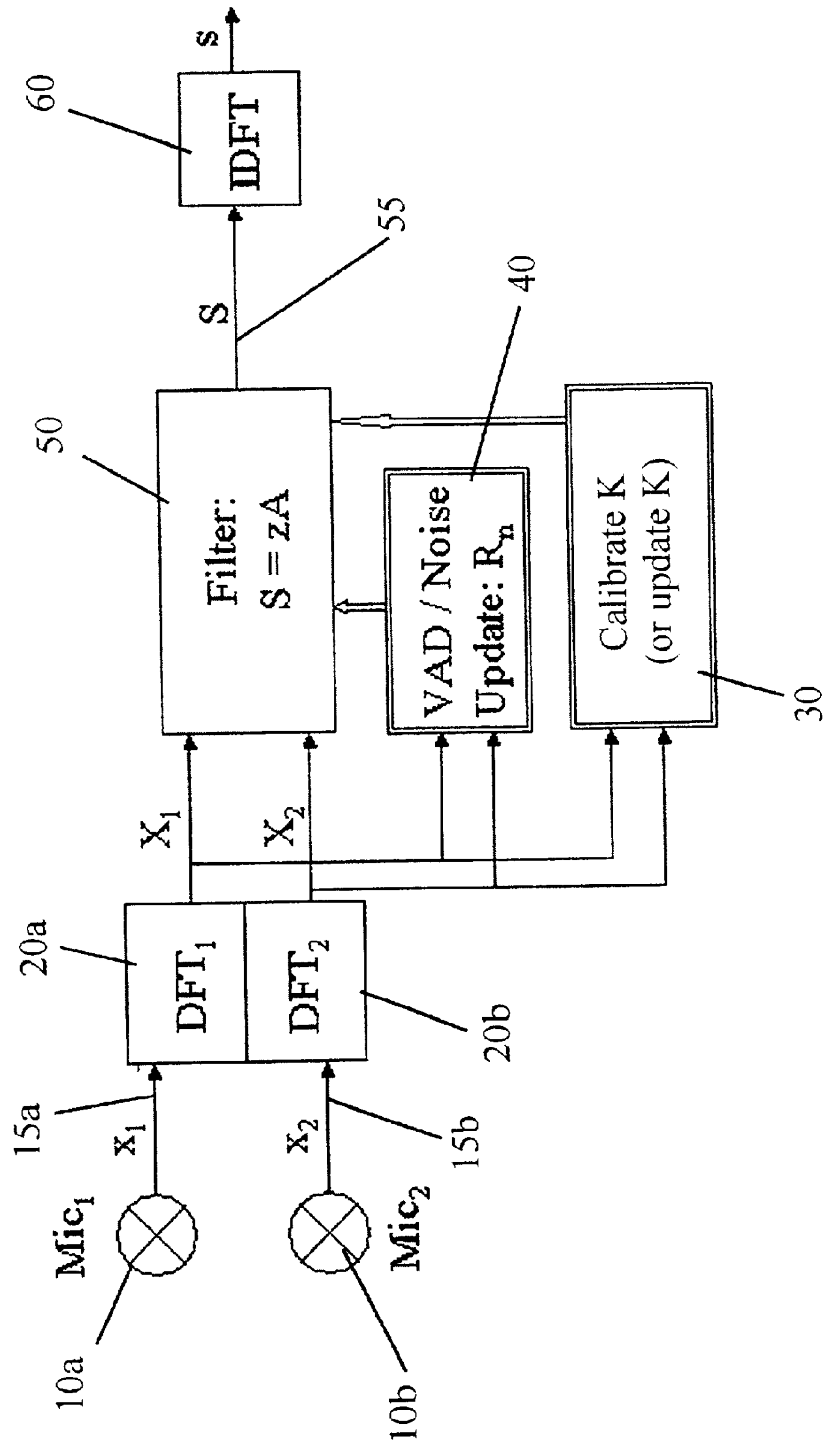
FIG. 1 is a block diagram of an embodiment of the invention.

Referring to FIG. 1, a pair of signals, $x_1$ and $X_2$ are input from a pair of microphones 10 and each signal is received separately through a pair of channels 15*a*, 15*b* into separate discrete Fourier transformers 20 to yield Fourier transformed signals $X_1$ and $X_2$. The microphones may be spaced any suitable distance apart, and will typically be spaced within a fraction of an inch apart when the invention is used on small devices, such as cellphones, but may be spaced many feet apart for use in conference rooms or other large spaces. The invention may be used indoors or outdoors.

A mixing model may be given by:

$$x_1(t)=s(t)+n_1(t) \tag{1}$$

$$x_2(t)=k*s(t)+n_2(t) \tag{2}$$

where $x_1(t)$, $x_2(t)$ are the two synchronously sampled signals, s(t) is the target signal as measured by the first microphone in the absence of the ambient noise, and $n_1(t)$; $n_2(t)$ are the ambient noise signals, all sampled at moment t. The sequence k represents the relative impulse response between the two channels and is defined in the frequency domain by the ratio of the two measured signals $(x_1^0, x_2^0)$ in the absence of noise:

$$K(\omega)=\frac{X_2^0(\omega)}{X_1^0(\omega)} \tag{3}$$

A preferred method is applied in the frequency domain, thus we do not make explicit use of the sequence k, but rather of the function K( ). In frequency domain, the mixing model of Equations 1, 2 becomes:

$$X_1(\omega)=S(\omega)+N_1(\omega) \tag{4}$$

$$X_2(\omega)=K(\omega)S(\omega)+N_2(\omega) \tag{5}$$

where $X_1$, $X_2$, S, $N_1$, $N_2$ are the short-time spectral representations of $x_1$, $x_2$, s, $n_1$, and $n_2$, respectively.

It will generally be preferable to calibrate the system beforehand to obtain a precise value of for K( ), which will vary according to the environment and equipment. This can be done by receiving the target sound (e.g., a voice speaking a sentence) through the two microphone channels 15 in the absence or near absence of noise. Based on the two recordings, $x_1^c(t)$ and $x_2^c(t)$, the constant K(ω) is estimated by:

$$K(\omega)=\frac{\sum_{t=1}^{F} X_2^c(l,\omega)\overline{X_1^c(l\cdot\omega)}}{\sum_{t=1}^{F} |X_1^c(l,\omega)|^2} \tag{6}$$

where $X_1^c(l,\omega)$, $X_2^c(l,\omega)$ represents the discrete windowed Fourier transform at frequency ω, and time-frame index l of the signals $x_1^c$, $x_2^c$. The time-frame index l represents the current block of signal data and will be omitted from the remaining equations in this disclosure for reasons of clarity. Calibration may be effected by a separate Calibrator 30, which performs the estimation of Equation 6. Windowing may be effected by use of a Hamming window w(.) of a suitable size, such as 512 samples, such as are described in D. F. Elliott (Ed.), *Handbook of Digital Signal Processing*, Engineering Applications, Academic Press, 1987, the disclosures of which are incorporated by reference herein in their entirety. An alternative to calibrating K is to update its value on-line. K would be adapted either on every time frame, or on frames where voice has been detected using a linear combination between its old value and the value given by Equation 6:

$$K^t(\omega)=(1-\alpha)K^{t-1}(\omega)+\alpha K(\omega) \tag{6b}$$

where the typical value of the adaptation rate α is 0.2. In this case the Calibrator 30 is instead an Updater 30.

After calibration, it is desirable to enhance the target signal. During nominal use, the invention will use $X_1(\omega)$, $X_2(\omega)$ (i.e., the discrete Fourier transforms on current time-frame of $x_1$, $x_2$, windowed by ω and an estimate of a noise spectral power 2×2 matrix $R_n$:

$$R_n=[R_{11}, R_{12}; R_{21}, R_{22}] \tag{7}$$

The ideal noise spectral matrix is defined by $$\hat{R}_n=E\begin{bmatrix} N_1 \\ N_2 \end{bmatrix}[\overline{N}_1, \overline{N}_2] \tag{8}$$

where E is the expectation operator. During normal operation, the method of the invention will update the noise spectral power matrix $R_n^{new}$ periodically, as will be described more fully below. On startup, the system will preferably use spectral subtraction on one of the channels, such as for example the first channel 15*a*, to estimate the signal spectral power:

$$R_s=\theta(|X_1|^2-R_{n11}),\ \theta(x)=\begin{cases} x, & \text{if } x>C_vR_{n11} \\ C_vR_{n11} & \text{otherwise} \end{cases} \tag{9}$$

where $C_v$ is a floor-level noise parameter in the range of 0 to 1. Typically, $C_v$ may be set to about 0.05 for most purposes. The setting and updating of the spectral power matrix is performed by the spectral power matrix updater 40.

Next the invention computes a short-time spectral amplitude estimate. More specifically we are looking for the minimum variance estimator of short time spectral amplitude |S|. Using the previous assumptions, the MVE of the short-time spectral amplitude |S| is given by:

$$|S|=E[|S||X_1, X_2] \tag{10}$$

such as is described in H. V. Poor, *An Introduction to Signal Detection and Estimation,* 2nd Edition, Springer Verlag, 1994, the disclosures of which are incorporated by reference herein in their entirety.

Using Bayes formula, the conditional expectation becomes:

$$E[|S|\,|\,X_1, X_2]=\frac{\int_0^\infty du\int_0^{2\pi} d\alpha\, u\, p(X_1, X_2\,|\,|S|=u, \arg(S)=\alpha)\; p(\arg(S)=\alpha)p(|S|=u)}{\int_0^\infty du\int_0^{2\pi} d\alpha\, p(X_1, X_2\,|\,|S|=u, \arg(S)=\alpha)\; p(\arg(S)=\alpha)p(|S|=u)} \tag{11}$$

The Gaussianity assumption implies the following probability density functions:

$$p(X_1, X_2\,|\,|S|=u, \arg(S)=\alpha)=\frac{1}{\pi\sqrt{\det R_n}}\cdot\exp\left\{-[\,\overline{X}_1-ue^{-i\alpha}\quad \overline{X}_2-\overline{K}ue^{-i\alpha}\,]R_n^{-1}\begin{bmatrix} X_1-ue^{i\alpha} \\ X_2-Kue^{i\alpha} \end{bmatrix}\right\} \tag{12}$$

$$p(\arg(S)=\alpha)=\frac{1}{2\pi} \tag{13}$$

$$p(|S|=u)=\frac{2}{\rho_s u}\exp\left(-\frac{u^2}{\rho_s}\right) \tag{14}$$

The integral over α turns into:

$$\int_0^{2\pi} p(X_1, X_2 \mid \arg(S)=\alpha, |S|=u)p(arg(S)=\alpha)p(|S|=u)d\alpha = \exp\left\{-\frac{1}{\det R_n}[|X_1|^2R_{22}+|X_2|^2R_{11}-\overline{X}_1X_2R_{12}-X_1\overline{X}_2R_{21}]\right\}\times \exp\left\{-\frac{u^2}{\det R_n}[R_{22}+R_{11}|K|^2-KR_{12}-\overline{K}R_{21}]\right\}2\pi\, I_0\left(\frac{2u}{\det R_n}|\overline{X}_1R_{22}+\overline{X}_2KR_{11}-X_2R_{12}-X_1\overline{K}R_{21}|\right) \tag{14}$$

Inserting this expression into the formula above and changing the variable $C_2u=a$, the conditional expectation turns into:

$$E[|S| \mid X_1, X_2] = \frac{1}{C_2}\int_0^\infty \frac{a^2\exp\left(-\frac{C_1}{C_2^2}a^2\right)I_0(a)da}{\int_0^\infty a\exp\left(-\frac{C_1}{C_2^2}a^2\right)I_0(a)da} \tag{16}$$

where:

$$C_1 = \frac{1}{\rho_s}+\frac{1}{\det R_n}(R_{22}+R_{11}|K|^2-KR_{12}-\overline{K}R_{21}) \tag{17}$$

$$C_2 = \frac{2}{\det R_n}|\overline{X}_1R_{22}+\overline{X}_2KR_{11}-X_2R_{12}-X_1\overline{K}R_{21}| \tag{18}$$

and $R_{ij}$ denotes the (i, j)'th entry of $R_n$. Using derivations similar to Ephraim-Malah derivations such as described in Y. Ephraim and D. Malah, *Speech enhancement using a minimum mean-square error short-time spectral amplitude estimator*, IEEE Trans. on Acoustics, Speech, and Signal Processing, 32(6):1109–1121, 1984, the disclosures of which are incorporated by reference herein in their entirety, the above integrals turn into:

$$|\hat{S}| = E[|S| \mid X_1, X_2] = \frac{\sqrt{\pi}}{2}\frac{1}{\sqrt{C_1}}\exp\left(-\frac{C_2^2}{8C_1}\right)\left[\left(1+\frac{C_2^2}{4C_1}\right)I_0\left(\frac{C_2^2}{8C_1}\right)+\frac{C_2^2}{4C_1}I_1\left(\frac{C_2^2}{8C_2}\right)\right] \tag{19}$$

where $I_0$, $I_1$ are the modified Bessel functions of the first kind (such as are described in I. S. Gradshteyn and I. M. Ryzhik, *Table of Integrals, Series, and Products*, 4th Edition, Academic Press, 1980, the disclosures of which are incorporated by reference herein in their entirety) defined by $$I_0(z) = \frac{1}{2\pi}\int_0^{2\pi}\exp(z\cos\beta)d\beta \text{ and} \tag{20a}$$

$$I_n(1) = \frac{1}{2\pi}\int_0^{2\pi}\cos(\beta)\exp(z\cos\beta)d\beta \tag{20b}$$

Notice that for K=0 and $R_{12}=R_{21}=0$, the parameters $C_1$, $C_2$ in (19) and (20) turns into $$= C_1 = \frac{1}{\rho_s}+\frac{1}{R_{11}} \text{ and } C_2 = \frac{2}{R_{11}}|X_1|.$$

Thus $$\frac{C_2^2}{4C_1} = \frac{\frac{\rho_s}{R_{11}}}{1+\frac{\rho_s}{R_{11}}}\frac{|X_1|^2}{R_{11}} = v \tag{21}$$

$$\frac{1}{\sqrt{C_1}} = \frac{\sqrt{v}}{\gamma}|X_1| \tag{22}$$

where $$v = \frac{\xi}{1+\xi}\gamma,\ \xi = \frac{\rho_s}{R_{11}},\ \gamma = \frac{|X_1|^2}{R_{11}}$$

are the Ephraim-Malah parameters. Thus (21) reduces to the single channel Ephraim-Malah estimator known from *Y. Ephraim and D. Malah* (1984), supra.

The invention now computes a short-time spectral complex exponential estimate, wherein several optimization problems are formulated to estimate the phase arg(S) of Fourier transformed target signal S. The first estimator is simply the MVE of $e^{i\ arg(S)}$. The formal derivation yields:

$$MVE(e^{i\ arg(S)})=E[e^{i\ arg(S)}|X_1, X_2] \tag{22}$$

Let us denote $\Phi(X_1, X_2)=E[e^{i\ arg(S)}|X_1,X_2]$. It turns out, in general $$|\Phi(X_1, X_2)\neq 1 \tag{23}$$

Thus, Φ cannot be associated to any phase.

The second optimal problem is to find MVE of $e^{i\ arg(S)}$ constrained over modulus 1 estimators. Thus we want to minimize:

$$\min_{z=z(X_1,X_2),|z|=1}E[|e^{i\ arg(S)}-z|^2] \tag{25}$$

which, by conditioning over X1, X2, turns into:

$$\min_{|z|=1}E[|e^{i\ arg(S)-z}|^2|X_1, X_2] \tag{26}$$

The constrained MVE solution is immediate (using Lagrange multiplier):

$$ConstrainedMVE(e^{i\arg(S)}) = \frac{E[e^{i\arg(S)} \mid X_1, X_2]}{E[e^{i\arg(S)} \mid X_1, X_2]} = \frac{\Phi(X_1, X_2)}{|\Phi(X_1, X_2)|} \tag{27}$$

Thirdly, we may want to find the optimal phase estimator in the sense suggested in A. S. Wilsky, *Fourier series and estimation on the circle with applications to synchronous communication—part i: Analysis*, IEEE Trans. IT, 20:577–583, 1974, the disclosures of which are incorporated by reference herein in their entirety, namely:

$$\hat{\alpha}=\arg\min_{\alpha(x_1,x_2)}E[1-\cos(\arg(S)-\alpha)] \tag{28}$$

Again, by conditioning over $X_1$, $X_2$, we get:

$$\tan(\hat{\alpha}) = \frac{E[\sin(\arg(S)) \mid X_1, X_2]}{E[\cos(\arg(S)) \mid X_1, X_2]} = \frac{\text{imag}(\Phi(X_1, X_2))}{\text{real}(\Phi(X_1, X_2))} \tag{29}$$

Thus:

$$e^{i\hat{\alpha}}=\text{Constrained}MVE(e^{i\ arg(S)}) \tag{30}$$

In effect, we checked that the constrained MVE of the phase coincides with the optimal estimator w.r.t. criterion of Equation (24) and is given by:

$$e^{i\hat{\arg}(S)} = \frac{\Phi(X_1, X_2)}{|\Phi(X_1, X_2)|} \tag{31}$$

Let us compute now $\Phi(X_1, X_2)=E[e^{i\,arg(S)}|X_1,X_2]$. Similar to (15) and writing $e^{i\,arg(S)}=e^{i(arg(S)-\beta)}e^{i\beta}$ we obtain:

$$\Phi(X_1, X_2) = e^{i\beta} \frac{\int_0^\infty du \int_0^{2\pi} d\alpha e^{i(\alpha-\beta)} p(X_1, X_2 \mid u, \alpha) p(|S| = u) p(\arg(S) = \alpha)}{\int_0^\infty du \int_0^{2\pi} d\alpha p(X_1, X_2 \mid u, \alpha) p(|S| = u) p(\arg(S) = \alpha)} \tag{32}$$

We define the following quantity, $L(\beta,u)$:

$$L(\beta, u) = \int_0^{2\pi} d\alpha \sin(\alpha - \beta) p(X_1, X_2 \mid u, \alpha) \tag{33}$$

We shall choose $\beta$ in such a way such that:

$$L(\beta,u)=0\forall u \tag{34}$$

Using (12) we obtain:

$$L(\beta, u) = T(X_1, X_2, u) \int_0^{2\pi} d\alpha \sin(\alpha - \beta) \exp \left\{ \frac{u}{\det R_n} [e^{-i\alpha}(R_{22}X_1 + R_{11}\overline{K}X_2 - R_{21}\overline{K}X_1 - R_{12}X_2) + c.c.] \right\} \tag{35}$$

where $T(X_1, X_2, u)$ collects all the terms that do not depend on $\alpha$ of Equation (12). Note that $T(X_1, X_2, u)$ is real. Let $w=R_{22}X_1+R_{11}\overline{K}X_2-R_{21}\overline{K}X_1-R_{12}X_2$. Thus:

$$L(\beta, u) = T(X_1, X_2, u) \int_0^{2\pi} d\alpha \sin(\alpha - \beta) \exp\left\{ \frac{2u|w|}{\det R_n} \cos(\alpha - \arg(w)) \right\} \tag{36}$$

Note, by choosing $\beta=\arg(w)$, the integral vanishes. Note also that $L(\beta, u)$ corresponds also to the imaginary part of $\Phi(X_1,X_2)e^{-i\beta}$ from Equation (32). Thus we proved:

$$\arg(\Phi(X_1, X_2))=\arg(R_{22}X_1+R_{11}\overline{K}X_2-R_{21}\overline{K}X_1-R_{12}X_2) \tag{37}$$

and the optimal estimator (31) becomes:

$$z \equiv e^{i\hat{\arg}(S)} = \frac{R_{22}X_1 + R_{11}\overline{K}X_2 - R_{21}\overline{K}X_1 - R_{12}X_2}{|R_{22}X_1 + R_{11}\overline{K}X_2 - R_{21}\overline{K}X_1 - R_{12}X_2|} \tag{38}$$

Note that for $K=0$, $R_{12}=R_{21}=0$, the above expression becomes $e^{i\,arg(S)}=e^{i\,arg(X1)}$, which is the estimator used by *Y. Ephraim and D. Malah* (1984), supra.

Generally speaking, the estimations of short-time spectral amplitude and short-time spectral complex exponential will be optimal in the sense of minimum variance estimation and minimum mean square error, if the following conditions are satisfied:

(a) The mixing model (1,2) is time-invariant;

(b) The target signal s is short-time stationary and has zero-mean Gaussian distribution;

(c) The noise n is short-time stationary and has zero-mean Gaussian distribution;

(d) The target signal s is statistically independent of the two noises $n_1$; $n_2$.

We may now compute the target signal short-time estimate by multiplying (19) with (28):

$$S=z|\hat{S}| \tag{29}$$

and return in time domain through the overlap-add procedure using the windowed inverse discrete Fourier transformer 50 through the output channel 55, thereby obtaining an estimate for the target signal s in the time domain, which is the noise-filtered target signal s. Generally the three steps of estimating the signal short-time spectral amplitude, estimating the signal short-time spectral complex exponential, and computing S is handled by the filter 50.

Lastly, the power matrix is updated. This may be done on a regular periodic basis, or whenever there is a lull in the target signal, such as a lull in speech. For example, a voice activity detector (VAD), such as for example that described in R. Balan, S. Rickard, and J. Rosca, *Method for voice detection in car environments for two-microphone inputs*, Invention Disclosure, December 2000, IPD 2000E22789 US, the disclosures of which are incorporated by reference herein in their entirety, may be used to detect whether voice is present in the current frame of data. If voice is not present, the power matrix updater 40 then updates the noise spectral power matrix using the formula:

$$R_n^{new} = (1 - \alpha)R_n + \alpha \begin{bmatrix} X_1 \\ X_2 \end{bmatrix} [\,\overline{X}_1 \quad \overline{X}_2\,] \tag{30}$$

where $\alpha$ is a noise learning rate between 0 and 1, and will typically be set to about 0.2 for most applications.

Figure 2:
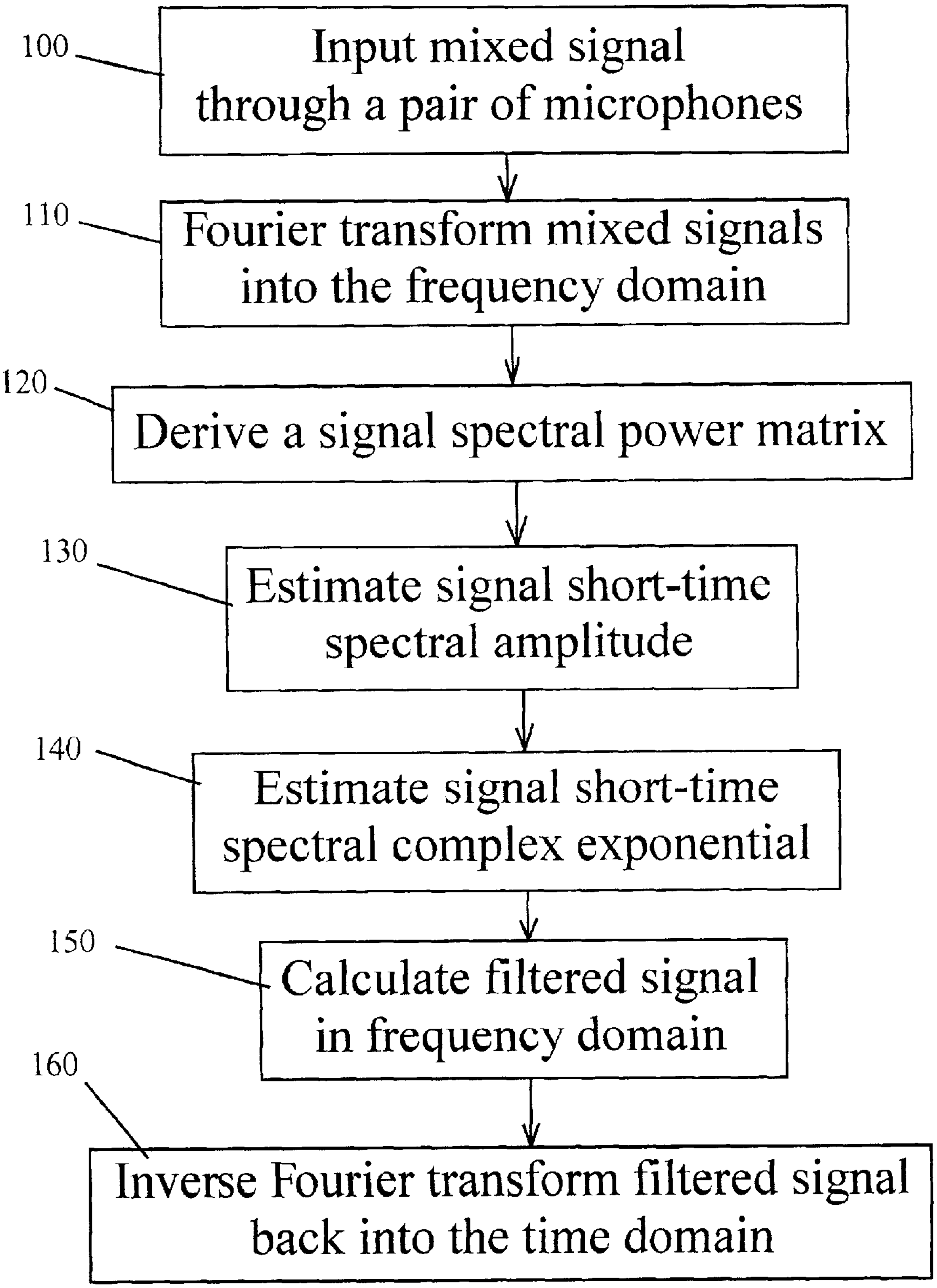
FIG. 2 is a flow diagram of a method of the invention.

Referring to FIG. 2, the steps of the method of the invention may be summarized as follows:

1. Input a mixed signal through a pair of microphones.
2. Fourier transform each mixed signal into the frequency domain.
3. Derive 100, a signal spectral power matrix.
4. Estimate 110, the signal short-time spectral amplitude.
5. Estimate 120, the signal short-time spectral complex exponential.
6. Estimate 130, the filtered target signal in the frequency domain.
7. Return 140, the filtered target signal to the time domain by inverse Fourier transformation.

The methods of the invention may be implemented as a program of instructions, readable and executable by machine such as a computer, and tangibly embodied and stored upon a machine-readable medium such as a computer memory device.

It is to be understood that all physical quantities disclosed herein, unless explicitly indicated otherwise, are not to be construed as exactly equal to the quantity disclosed, but rather as about equal to the quantity disclosed. Further, the mere absence of a qualifier such as "about" or the like, is not to be construed as an explicit indication that any such disclosed physical quantity is an exact quantity, irrespective of whether such qualifiers are used with respect to any other physical quantities disclosed herein.

While preferred embodiments have been shown and described, various modifications and substitutions may be made thereto without departing from the spirit and scope of the invention. Accordingly, it is to be understood that the present invention has been described by way of illustration only, and such illustrations and embodiments as have been disclosed herein are not to be construed as limiting to the claims.

What is claimed is:

1. A method of filtering noise from a mixed sound signal to obtained a filtered target signal, comprising the steps of:

inputting the mixed signal through a pair of microphones into a first channel and a second channel;

separately Fourier transforming each said mixed signal into the frequency domain;

computing a signal short-time spectral amplitude $|\hat{S}|$ from said transformed signals;

computing a signal short-time spectral complex exponential $e^{i\ arg(S)}$ from said transformed signals, where arg(S) is the phase of the target signal in the frequency domain;

computing said target signal S in the frequency domain from said spectral amplitude and said complex exponential, further comprising the step of computing a spectral power matrix and using said spectral power matrix to compute said spectral amplitude and said spectral complex exponential.

2. The method of claim 1 wherein said target signal S in the frequency domain is inverse Fourier transformed to produce a filtered target signal s in the time domain.

3. The method of claim 1 wherein said spectral power matrix is computed by spectral channel subtraction.

4. The method of claim 1 wherein said signal short-time spectral amplitude is computed by the estimation equation $$|\hat{S}| = E[|S|\,|\,X_1, X_2] = \frac{\sqrt{\pi}}{2}\frac{1}{\sqrt{C_1}}\exp\left(-\frac{C_2^2}{8C_1}\right)\left[1+\frac{C_2^2}{4C_1}I_0\left(\frac{C_2^2}{8C_1}\right)+\frac{C_2^2}{4C_1}I_1\left(\frac{C_2^2}{8C_2}\right)\right]$$

$$\text{where } I_0(z) = \frac{1}{2\pi}\int_0^{2\pi}\exp(z\cos\beta)d\beta,$$

$$I_n(1) = \frac{1}{2\pi}\int_0^{2\pi}\cos(\beta)\exp(z\cos\beta)d\beta,$$

$$C_1 = \frac{1}{\rho_s}+\frac{1}{\det R_n}(R_{22}+R_{11}|K|^2-KR_{12}-\overline{K}R_{21}),$$

$$C_2 = \frac{2}{\det R_n}|\overline{X}_1R_{22}+\overline{X}_2KR_{11}-X_2R_{12}-X_1\overline{K}R_{21}|,$$

$X_1$ and $X_2$ are the Fourier transformed first and second signals respectively, $R_{nm}$ are elements of said spectral power matrix, and K is a constant.

5. The method of claim 1 wherein said signal short-time spectral complex exponential is computed by the estimation equation $$z \equiv e^{i\arg\hat{(S)}} = \frac{R_{22}X_1+R_{11}\overline{K}X_2-R_{21}\overline{K}X_1-R_{12}X_2}{|R_{22}X_1+R_{11}\overline{K}X_2-R_{21}\overline{K}X_1-R_{12}X_2|}.$$

6. The method of claim 1 wherein said signal short-time spectral complex exponential is computed by the estimation equation $$z \equiv e^{i\arg\hat{(S)}} = \frac{R_{22}X_1+R_{11}\overline{K}X_2-R_{21}\overline{K}X_1-R_{12}X_2}{|R_{22}X_1+R_{11}\overline{K}X_2-R_{21}\overline{K}X_1-R_{12}X_2|}.$$

7. The method of claim 6 wherein said target signal S in the frequency domain is computed by the equation $$S=zA.$$

8. The method of claim 1 wherein said target signal is computed by multiplying said signal short-time spectral amplitude by said signal short-time spectral complex exponential.

9. The method of claim 1 further comprising the step of calibrating a function K(ω), said function equal to a ratio of one said Fourier transformed signal to the other, by the estimation equation $$K(\omega) = \frac{\sum_{t=1}^{F} X_2^c(l,\omega)\overline{X_1^c(l\cdot\omega)}}{\sum_{t=1}^{F}|X_1^c(l,\omega)|^2}$$

where $X_1^c(l,\omega)$, $X_2^c(l,\omega)$ represents the discrete windowed Fourier transform at frequency ω, and time-frame index l of the transformed signals $x_1^c$, $x_2^c$ within time frame c.

10. An apparatus for filtering noise from a mixed sound signal to obtained a filtered target signal, comprising:

a pair of input channels for receiving mixed signals from a pair of microphones;

a pair of Fourier transformers, each receiving a mixed signal from one of said channels and Fourier transforming said mixed signal into a transformed signal in the frequency domain;

a filter, said filter receiving said transformed signals and computing a signal short-time spectral amplitude $|\hat{S}|$ and a signal short-time spectral complex exponential $e^{i\ arg(S)}$ from said transformed signals, where arg(S) is the phase of the target signal in the frequency domain;

Wherein said filter computes said target signal S in the frequency domain from said spectral amplitude and said complex exponential and further comprising a spectral power matrix updater, said updater receiving said transformed signals and computing therefrom a spectral power matrix, and outputting said spectral power matrix to said filter.

11. The apparatus of claim 10 further comprising an inverse Fourier transformer receiving said target signal S in the frequency domain and inverse Fourier transforming said target signal into a filtered target signal s in the time domain.

12. A program storage device readable by machine, tangibly embodying a program of instructions executable by machine to perform method steps for filtering noise from a mixed sound signal to obtained a filtered target signal, said method steps comprising:

inputting the mixed signal through a pair of microphones into a first channel and a second channel;

separately Fourier transforming each said mixed signal into the frequency domain;

computing a signal short-time spectral amplitude $|\hat{S}|$ from said transformed signals;

computing a signal short-time spectral complex exponential $e^{i\ arg(S)}$ from said transformed signals, where arg(S) is the phase of the target signal in the frequency domain;

computing said target signal S in the frequency domain from said spectral amplitude and said complex exponential, further comprising the step of computing a spectral power matrix and using said spectral power matrix to compute said spectral amplitude and said spectral complex exponential.

13. The device of claim 12 wherein said target signal S in the frequency domain is inverse Fourier transformed to produce a filtered target signal s in the time domain.

14. The device of claim 12 wherein said spectral power matrix is computed by spectral channel subtraction.

15. The device of claim 12 wherein said signal short-time spectral amplitude is computed by the estimation equation $$|\hat{S}| = E[|S| \mid X_1, X_2] = \frac{\sqrt{\pi}}{2}\frac{1}{\sqrt{C_1}}\exp\left(-\frac{C_2^2}{8C_1}\right)\left[1 + \frac{C_2^2}{4C_1}I_0\left(\frac{C_2^2}{8C_1}\right) + \frac{C_2^2}{4C_1}I_1\left(\frac{C_2^2}{8C_2}\right)\right]$$

$$\text{where } I_0(z) = \frac{1}{2\pi}\int_0^{2\pi}\exp(z\cos\beta)d\beta,$$

$$I_n(1) = \frac{1}{2\pi}\int_0^{2\pi}\cos(\beta)\exp(z\cos\beta)d\beta,$$

$$C_1 = \frac{1}{\rho_s} + \frac{1}{\det R_n}(R_{22} + R_{11}|K|^2 - KR_{12} - \overline{K}R_{21}),$$

$$C_2 = \frac{2}{\det R_n}|\overline{X}_1R_{22} + \overline{X}_2KR_{11} - X_2R_{12} - X_1\overline{K}R_{21}|,$$

$X_1$ and $X_2$ are the Fourier transformed first and second signals respectively, $R_{nm}$ are elements of said spectral power matrix, and K is a constant.

16. The device of claim 12 wherein said signal short-time spectral complex exponential is computed by the estimation equation $$z \equiv e^{i\arg\hat{}(S)} = \frac{R_{22}X_1 + R_{11}\overline{K}X_2 - R_{21}\overline{K}X_1 - R_{12}X_2}{|R_{22}X_1 + R_{11}\overline{K}X_2 - R_{21}\overline{K}X_1 - R_{12}X_2|}.$$

17. The device of claim 12 wherein said signal short-time spectral complex exponential is computed by the estimation equation $$z \equiv e^{i\arg\hat{}(S)} = \frac{R_{22}X_1 + R_{11}\overline{K}X_2 - R_{21}\overline{K}X_1 - R_{12}X_2}{|R_{22}X_1 + R_{11}\overline{K}X_2 - R_{21}\overline{K}X_1 - R_{12}X_2|}.$$

18. The device of claim 17 wherein said target signal S in the frequency domain is computed by the equation $$S=zA.$$

19. The device of claim 12 wherein said target signal is computed by multiplying said signal short-time spectral amplitude by said signal short-time spectral complex exponential.

20. A program storage device readable by machine, tangibly embodying a program of instructions executable by machine to perform method steps for filtering noise from a mixed sound signal to obtained a filtered target signal, said method steps comprising:

inputting the mixed signal through a pair of microphones into a first channel and a second channel;

separately Fourier transforming each said mixed signal into the frequency domain;

computing a signal short-time spectral amplitude $|\hat{S}|$ from said transformed signals;

computing a signal short-time spectral complex exponential $e^{i\ arg(S)}$ from said transformed signals, where arg(S) is the phase of the target signal in the frequency domain;

computing said target signal S in the frequency domain from said spectral amplitude and said complex exponential, further comprising the step of calibrating a function K(ω), said function equal to a ratio of one said Fourier transformed signal to the other, by the estimation equation $$K(\omega) = \frac{\sum_{t=1}^{F} X_2^c(l,\omega)\overline{X_1^c(l\cdot\omega)}}{\sum_{t=1}^{F}|X_1^c(l,\omega)|^2}$$

where $X_1^c(l,\omega)$, $X_2^c(l,\omega)$ represents the discrete windowed Fourier transform at frequency ω, and time-frame index l of the transformed signals $x_1^c$, $x_2^c$ within time frame c.

21. A program storage device readable by machine, tangibly embodying a program of instructions executable by machine to perform method steps for filtering noise from a mixed sound signal to obtained a filtered target signal, said method steps comprising:

inputting the mixed signal through a pair of microphones into a first channel and a second channel;

separately Fourier transforming each said mixed signal into the frequency domain;

computing a signal short-time spectral amplitude $|\hat{S}|$ from said transformed signals;

computing a signal short-time spectral complex exponential $e^{i\ arg(S)}$ from said transformed signals, where arg(S) is the phase of the target signal in the frequency domain;

computing said target signal S in the frequency domain from said spectral amplitude and said complex exponential, further comprising the step of updating a function K(ω), said function equal to a ratio of one said Fourier transformed signal to the other, said updating effected by using a linear combination between a previous value for K(ω) at a time t−1 and a current value for K(ω) at a time t according to the equation $$K^t(\omega)=(1-\alpha)K^{t-1}(\omega)+\alpha K(\omega)$$

where α is an adaptation rate.

* * * * *